(12) United States Patent
Hong

(10) Patent No.: US 11,234,177 B2
(45) Date of Patent: Jan. 25, 2022

(54) DATA OFFLOADING METHOD AND DEVICE, ACCESS POINT EQUIPMENT AND STATION

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 35 days.

(21) Appl. No.: 16/608,812

(22) PCT Filed: Jun. 23, 2017

(86) PCT No.: PCT/CN2017/089678
§ 371 (c)(1),
(2) Date: Oct. 25, 2019

(87) PCT Pub. No.: WO2018/232716
PCT Pub. Date: Dec. 27, 2018

(65) Prior Publication Data
US 2021/0105684 A1 Apr. 8, 2021

(51) Int. Cl.
*H04W 36/08* (2009.01)
*H04W 36/14* (2009.01)
*H04W 36/22* (2009.01)
*H04W 36/30* (2009.01)
*H04W 88/06* (2009.01)

(52) U.S. Cl.
CPC ........... *H04W 36/14* (2013.01); *H04W 36/08* (2013.01); *H04W 36/22* (2013.01); *H04W 36/30* (2013.01); *H04W 88/06* (2013.01)

(58) Field of Classification Search
CPC ..... H04W 36/14; H04W 36/08; H04W 36/22; H04W 36/20; H04W 88/06
USPC .............................. 455/331, 436, 418, 422.1
See application file for complete search history.

(56) References Cited

U.S. PATENT DOCUMENTS

| 2010/0022246 A1 | 1/2010 | Miki |
| 2011/0176511 A1 | 7/2011 | Sayeedi |

(Continued)

FOREIGN PATENT DOCUMENTS

| CN | 101018166 A | 8/2007 |
| CN | 103404196 A | 11/2013 |

(Continued)

OTHER PUBLICATIONS

International Search Report (including English translation) and Written Opinion issued in PCT/CN2017/089678, dated Feb. 24, 2018, 8 pages.

(Continued)

*Primary Examiner* — Danh C Le
(74) *Attorney, Agent, or Firm* — Arch & Lake LLP

(57) ABSTRACT

A data offloading method, device, user equipment, and base station are provided. The data offloading method includes: detecting a network status of an access point device; determining, when the network status meets a preset condition, a target cellular network standard for bearing service data of a multimode station; and transmitting a handover signaling to the multimode station, the handover signaling carrying information of the target cellular network standard.

10 Claims, 6 Drawing Sheets

(56) References Cited

U.S. PATENT DOCUMENTS

| | | | | |
|---|---|---|---|---|
| 2012/0009899 A1* | 1/2012 | Karaoguz | ............. | H04W 36/08 |
| | | | | 455/411 |
| 2012/0257602 A1* | 10/2012 | Takahashi | ......... | H04W 36/0061 |
| | | | | 370/336 |
| 2014/0235167 A1* | 8/2014 | Jung | ...................... | H04W 76/10 |
| | | | | 455/41.2 |
| 2016/0255546 A1* | 9/2016 | Sun | ................. | H04W 36/00837 |
| | | | | 455/436 |
| 2018/0213463 A1* | 7/2018 | Cheng | ................... | H04W 40/14 |
| 2018/0220341 A1* | 8/2018 | Dai | ......... | H04W 76/19 |
| 2019/0387449 A1* | 12/2019 | Li | ......... | H04W 36/14 |
| 2020/0059843 A1* | 2/2020 | Tang | ...................... | H04W 48/02 |
| 2020/0275337 A1* | 8/2020 | Liu | ................... | H04W 36/0044 |
| 2021/0007010 A1* | 1/2021 | Wen | ...................... | H04W 72/10 |

FOREIGN PATENT DOCUMENTS

| | | | |
|---|---|---|---|
| CN | 104703241 | A | 6/2015 |
| CN | 105338585 | A | 2/2016 |
| CN | 105357403 | A | 2/2016 |
| CN | 105357728 | A | 2/2016 |
| CN | 106793139 | A | 5/2017 |
| WO | 2016130353 | A2 | 8/2016 |

OTHER PUBLICATIONS

Huawei, Delivery of "Other SI" in NR, 3GPP TSG-RAN2 Meetting #95 bis, R2-166203, Oct. 14, 2016, description, paragraph 1-2, 6 pages.

First Office Action of Chinese Application No. 201780000504.5 dated Apr. 15, 2020 with English translation, (23p).

* cited by examiner

DATA OFFLOADING METHOD AND DEVICE, ACCESS POINT EQUIPMENT AND STATION

CROSS-REFERENCE TO RELATED APPLICATION

This application is a National Stage of International Application No. PCT/CN2017/089678, filed on PCT in Jun. 23, 2017, the contents of all of which are incorporated herein by reference in their entirety.

TECHNICAL FIELD

The present disclosure relates to the field of communication technologies, particularly to a data offloading method, a data offloading device, access point equipment and a station.

BACKGROUND

With the rapid development of wireless communication technology, the rapid increase in the number of wireless users, and the rapid emergence of high-definition multimedia streaming services, wireless spectrum resources are becoming scarcer. At the same time, users' requirement on network speed and network coverage continuity are becoming higher. In order to meet user demand for bandwidth, to make up the poor signal quality issues of Wireless Fidelity Access Points (WiFi AP) of Multiband Operation (MBO) in Wireless Local Area Network (WLAN), when it is determined that offloading is necessary, MBO AP can offload a MBO multimode Station (STA) to a mobile cellular network, such as Long Term Evolution (LTE) system, Global System for Mobile Communication (GSM) and other cellular networks.

SUMMARY

According to a first aspect of the present disclosure, there is provided a data offloading method, which is applied to an access point device, and the method comprises steps of:
detecting a network status of the access point device;
determining a target cellular network standard for bearing service data of a multimode station when the network status meets a preset condition; and
sending a handover signaling to the multimode station, the handover signaling carrying information of the target cellular network standard.

According to a second aspect of the present disclosure, there is provided a data offloading method, which is applied to a multimode station, and the method comprising steps of:
receiving a handover signaling sent by an access network device;
parsing information of a target cellular network standard from the handover signaling; and
transmitting service data over the target cellular network in the target cellular network standard.

According to a third aspect of the present disclosure, there is provided a data offloading device, which is applied to an access point device, wherein the device comprises:
a network status detecting module configured to detect the network status of the access point device;
a standard determining module configured to determine a target cellular network standard for bearing service data of a multimode station when the network status meets a preset condition; and
a first sending module configured to send a handover signaling to the multimode station, the handover signaling carrying information of the target cellular network standard.

According to a fourth aspect of the present disclosure, there is provided a data offloading device, which is applied to a multimode station, wherein the device comprises:
a receiving module configured to receive a handover signaling sent by an access network device;
a parsing module configured to parse information of a target cellular network standard from the handover signaling; and
a data transmission module configured to transmit service data over the target cellular network in the target cellular network standard.

According to a fifth aspect of the present disclosure, there is provided a user equipment, comprising:
a processor;
a memory for storing processor executable instructions;
in which the processor is configured to:
detecting a network status of an access point device;
determining a target cellular network standard for bearing service data of a multimode station when the network status meets a preset condition; and
sending a handover signaling to the multimode station, the handover signaling carrying information of the target cellular network standard.

According to a sixth aspect of the present disclosure, there is provided a base station, comprising:
a processor;
a memory for storing processor executable instructions;
in which the processor is configured to:
determining a network load status of a user equipment in a cell;
receiving a handover signaling sent by an access network device;
parsing information of a target cellular network standard from the handover signaling; and
transmitting service data over the target cellular network in the target cellular network standard.

According to a seventh aspect of the present disclosure, there is provided a non-transitory computer readable storage medium having computer instructions stored thereon, wherein the instructions are executed by a processor to implement steps of:
detecting a network status of an access point device;
determining a target cellular network standard for bearing service data of a multimode station when the network status meets a preset condition; and
sending a handover signaling to the multimode station, the handover signaling carrying information of the target cellular network standard.

According to an eighth aspect of the present disclosure, there is provided a non-transitory computer readable storage medium having computer instructions stored thereon, wherein the instructions are executed by a processor to implement steps of:
receiving a handover signaling sent by an access network device;
parsing information of a target cellular network standard from the handover signaling; and
transmitting service data over the target cellular network in the target cellular network standard.

It is to be understood that both the foregoing general description and the following detailed description are exemplary and explanatory only and are intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the disclosure as recited in the appended claims.

For overcoming the problems in the related art, the embodiments of the present disclosure provide a data offloading method, a data offloading device, access point equipment, and a station, so that the MBO AP can quickly and accurately offloading data of an MBO multi mode STA to an appropriate cellular network for transmission.

Figure 1A:
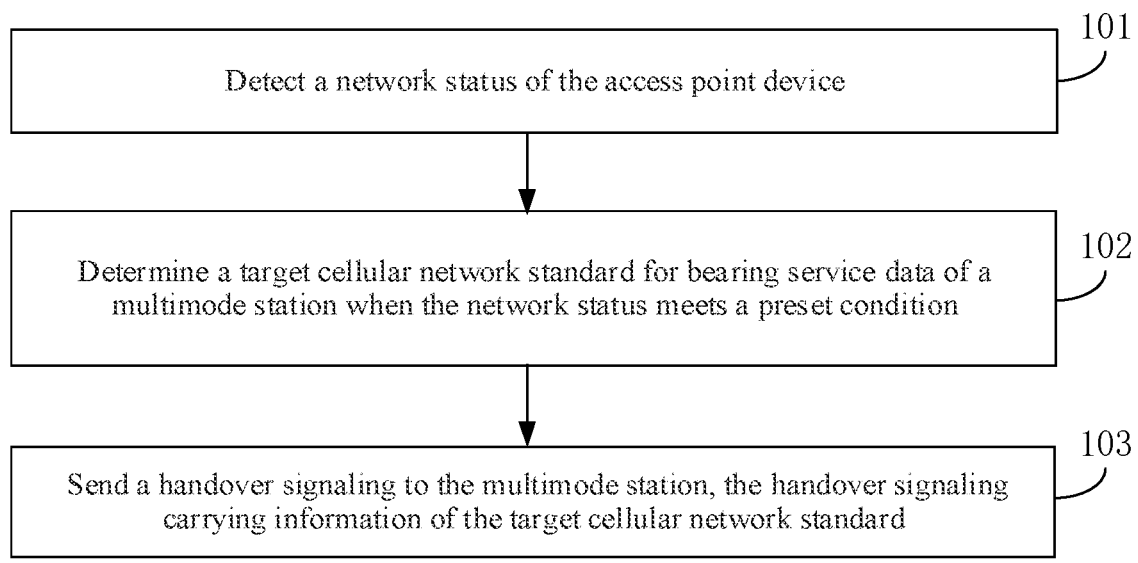
FIG. 1A is a flowchart of a data offloading method illustrated according to an exemplary embodiment.
Figure 1B:
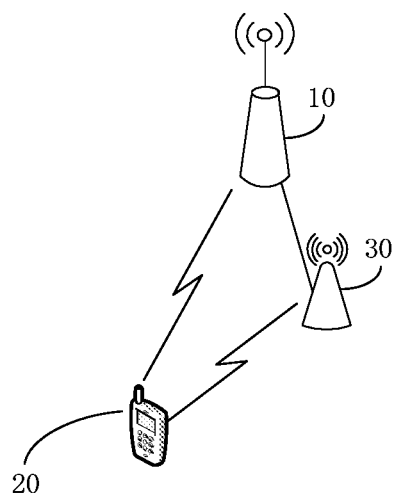
FIG. 1B is a scene diagram of a data offloading method illustrated according to an exemplary embodiment.

FIG. 1A is a flowchart of a data offloading method illustrated according to an exemplary embodiment, and FIG. 1B is a scene diagram of a data offloading method illustrated according to an exemplary embodiment. The data offloading method may be applied on the MBO AP, as shown in FIG. 1A. The data offloading method includes steps 101-103 as follows:

In step 101, the network status of the access point device is detected.

In an embodiment, the reference indexes for measuring the network status of the access point device may include, but is not limited to, load information of the access point device, link quality of the link with the station, buffered data of the station, and the like.

In an embodiment, when the load of the access point device is large, it can usually be understood that the network will be congested, and the data transmission efficiency will decrease. Because the link quality of the link with the station directly affects the data transmission efficiency of the station and the success rate of data transmission, the load information of the access point device and the link quality of the link with the station need to be used as reference indexes for measuring the network status.

In an embodiment, the amount of the buffered data of the station directly reflects the amount of the service data that the station needs to transmit, and the requirement for the network data transmission speed. Therefore, the buffered data of the station may also be used as the reference index for determining whether to offload the data of the station.

In step 102, when the network status meets a preset condition, the target cellular network standard for bearing the service data of the multimode station is determined.

Figure 2:
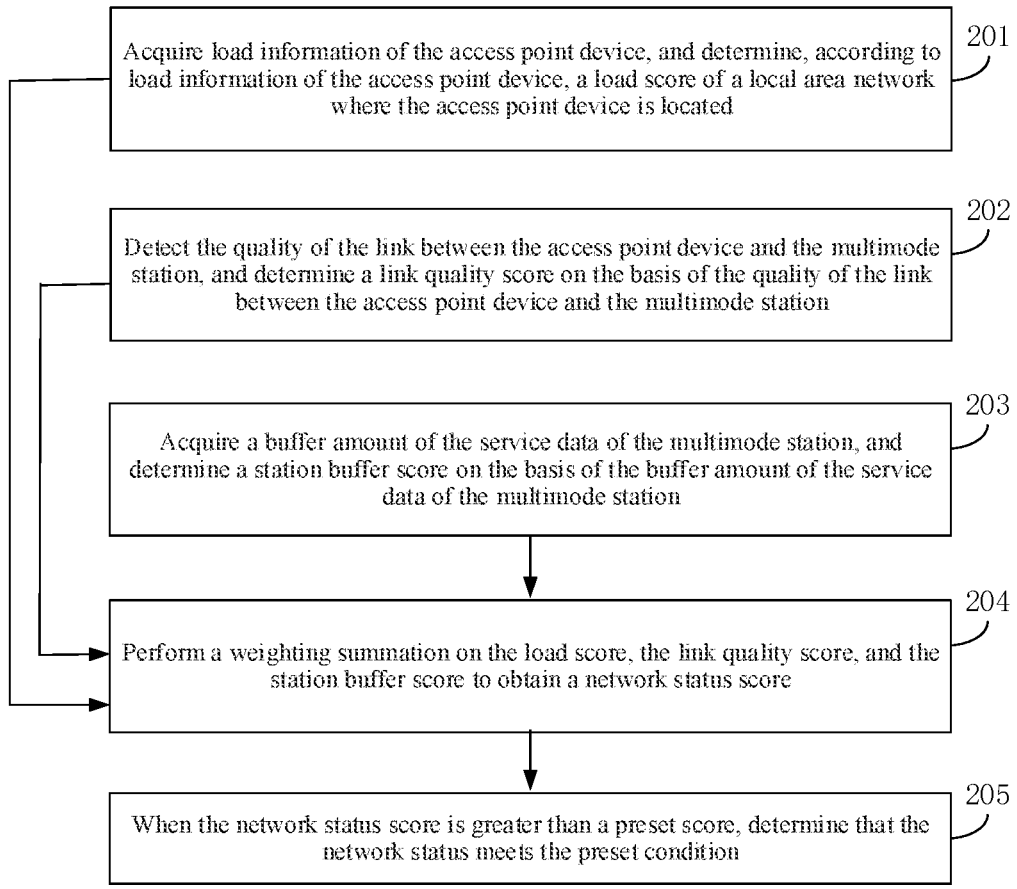
FIG. 2 is a flowchart of another data offloading method illustrated according to an exemplary embodiment.

In an embodiment, it may be determined whether the network status meets a preset condition on the basis of a reference index used to measure the network status of the access point device, as in the embodiment shown in FIG. 2, which is not described in detail here.

In an embodiment, the target cellular network standard for bearing the service data of the multimode station can be determined on the basis of the cellular network standards supported by the multimode station, the cellular network covering the current location, and the corresponding data load.

In an embodiment, a station of each of the access point device may report their supporting cellular network standards, e.g., the station supports the GSM, Code Division Multiple Access (CDMA), Time Division-Synchronous Code division Multiple Access (TD-SCDMA), Wideband Code Division Multiple Access (W-CDMA), Time Division Long Term Evolution (TD-LTE) and other cellular network standards, thereby enabling the access network device to determine a target cellular network standard for bearing the service data of the multimode station from the cellular network standard supported by the station.

In an embodiment, the access network device may acquire information of the cellular network covering the current location and the corresponding load data through a preset interface. The preset interface may be an internal interface provided by the cellular network operator. However, the interface type of the preset interface is not limited, and the preset interface may also be other interfaces that enable the access network device to sense the cellular network.

In an embodiment, after the access network device senses the cellular network covering the current location and the corresponding data load, it can determine the target cellular network standard which can provide optimal network service for the station device according to the cellular network standards supported by the station.

In step 103, a handover signaling is sent to the multimode station, the handover signaling carrying information of the target cellular network standard.

In an embodiment, the handover signaling can be a Cellular Data Connection Preference Attribute signaling selected in Basic Service Set (BSS) Transition Candidate List Entries. The target cellular network standard may be indicated in the Cellular Data Preference Field in the Cellular Data Connection Preference Attribute signaling.

In an embodiment, the handover signaling may further carry base station identification information of a base station for providing a data connection for the multimode station. The access point device may acquire load information of each base station, and determine the base station with the least load as a base station for providing a data connection for the multimode station.

In an exemplary scene, as shown in FIG. 1B, exemplary descriptions are given by providing an example in which the access point device is a wireless router, the target cellular network is an LTE network and the base station is an evolved Base Station (eNB). In the scene shown in FIG. 1B, eNB 10, the station 20, the access point device 30 are included. The access point device 30 determines target cellular network covering the current location and being capable to provide a good network service for the station 20 when it is determined that the network status of the current wireless local area network arrives a preset condition, and instructs the station 20 to transmit the service data through the eNB 10. Thereby, the pressure of the access point device 30 to transmit data is effectively alleviated, and the efficiency of data offloading is improved by accurately indicating the target cellular network.

In this embodiment, because the mobile network and the WLAN network are two independent communication networks, when the network status of the WLAN network arrive at a preset condition, such as a heavy network load and a poor link quality of the link with a multimode station, by implementing the foregoing technical solutions, the present embodiments can determine that the service data of the multimode station can be transmitted through the target cellular network in the target cellular network standard, so that it can accurately indicate that the service data of the multimode station are offloaded to the specific target cellular network. Therefore, it solves the problem in the related art that, the efficiency of implementing data offloading is reduced, because of a fact that the multimode station needs trying to access cellular networks in different standards because it cannot indicate that data are offloaded to which cellular network.

In an embodiment, the handover signaling may further carry base station identification information of a base station for providing a data connection for the multimode station.

In an embodiment, in the step of determining a target cellular network standard for bearing service data of the multimode station, the followed step is included:

determining the target cellular network standard for bearing the service data of the multimode station on the basis of the cellular network standard supported by the multimode station, the cellular network covering the current location, and the corresponding data load.

In an embodiment, the data offloading method may further include:

acquiring information of the cellular network covering the current location and the corresponding data load through a preset interface.

In an embodiment, in the step of detecting the network status of the access point device, the followed steps may be included:

acquiring load information of the access point device;

detecting the quality of the link between the access point device and the multimode station; and acquiring a buffer amount of the service data of the multimode station.

In an embodiment, the data offloading method may further include:

determining, according to load information of the access point device, a load score of a local area network where the access point device is located;

determining a link quality score on the basis of the quality of the link between the access point device and the multimode station;

determining a station buffer score on the basis of the buffer amount of the service data of the multimode station;

performing a weighting summation on the load score, the link quality score, and the station buffer score to obtain a network status score; and determining that the network status meets the preset condition when the network status score is greater than a preset score.

For the specific manner of data transmission, please refer to the subsequent embodiments.

So far, the foregoing method provided by the embodiment of the present disclosure can accurately indicate that the service data of the multimode station are offloaded to the specific target cellular network. Therefore, it solves the problem in the related art that, the efficiency of implementing data offloading is reduced, because of a fact that the multimode station needs trying to access cellular networks in different standards because it cannot indicate that data are offloaded to which cellular network.

The technical solution provided by the present disclosure embodiments will be descripted by specific examples as follows.

FIG. 2 is a flowchart of another data offloading method illustrated according to an exemplary embodiment. In the present embodiment, by using the above method provided by the present disclosure embodiment, exemplary descriptions are given by providing an example in which the access point device determines when to perform data offloading. As shown in FIG. 2, the following steps are included:

In step 201, the load information of the access point device is acquired, and on the basis of the load information of the access point device, the load score of the local area network where the access point device is located is determined, and step 204 is then performed.

In an embodiment, the access point device can count the total amount of data transmitted by all the access station devices through the wireless LAN, and determine the load information of the access point device by using the total amount of data, e.g., the load information is that the data transmission is unobstructed, the data transmission is congested; or the load information is that the load is too heavy, the load is normal, the load is light, and the like. In an embodiment, the heavier the load, the higher the determined load score, while the lighter the load, the lower the determined load score.

In an embodiment, the step of determining the load score on the basis of the load information is a process of quantifying the load information, indicating a correspondence that the heavier the load, the worse the network status.

In step 202, a link quality of the link between the access point device and the multimode station is detected, and a link quality score is determined on the basis of the link quality of the link between the access point device and the multimode station, and then perform step 204.

In an embodiment, the link quality may be determined on the basis of the reliability of data transmission between the access point device and the multimode station, such as the delay of data transmission, the error rate, etc. And the quality of the uplink and downlink may also be determined on the basis of the measurement of the reference signal. For the specific implementation method, please refer to the technical solutions of the prior art.

In an embodiment, it can be set that, the worse the link quality, the higher the corresponding determined link quality score.

In step 203, the buffer amount of the service data of the multimode station is acquired, and the station buffer score is determined on the basis of the buffer amount of the service data of the multimode station, and then step 204 is performed.

In an embodiment, generally the larger the buffer amount of the service data of the multimode station, the higher the requirement of the multimode station on data transmission speed. Generally, it can be set that, the greater the buffer amount, the higher the corresponding determined station buffer score.

In step 204, a weighting summation is performed on the load score, the link quality score, and the station buffer score to obtain a network status score.

In an embodiment, for the importance of the reference index as a trigger of the data offloading, a corresponding weight coefficient may be configured for each index. The weight coefficient w may be set by the access point device, for example, the weight coefficients for the link quality score and load score may be relatively high, while the weight coefficient for the station buffer score may be relatively low.

In an embodiment, the present disclosure document only describes the parameters used to measure network status such as load information of the access point device, link quality, station buffer or the like, but these are only exemplary, and the present disclosure does not limit that only the above parameters can be used to determine whether to trigger the data offloading.

In step 205, determined that the network status meets the preset condition when the network status score is greater than a preset score.

In this embodiment, the network status of the access point device is determined by using multiple reference indexes, and then the multimode station is indicated to access the cellular network in the target cellular network standard and perform data offloading when it is determined that the data of a multimode station needs to be offloaded on the basis of the network status.

Figure 3:
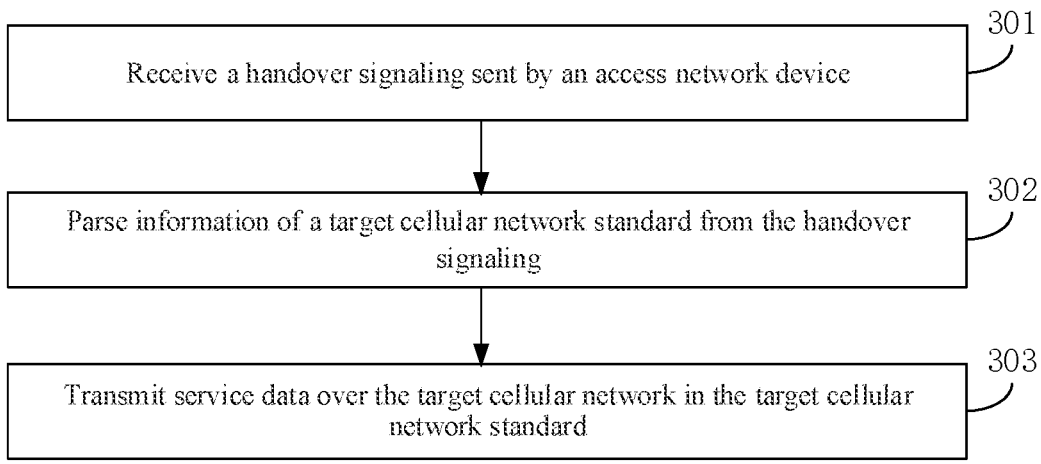
FIG. 3 is a flowchart of yet another data offloading method illustrated according to an exemplary embodiment.

FIG. 3 is a flowchart of yet another data offloading method illustrated according to an exemplary embodiment, the data offloading method may be applied to a multimode station. The exemplary description of the present embodiment will be made in conjunction with FIG. 1B. As shown in FIG. 3, the data offloading method includes the following steps 301-303:

In step 301, a handover signaling sent by the access network device is received.

In an embodiment, the handover signaling can be a Cellular Data Connection Preference Attribute signaling selected in BSS Transition Candidate List Entries, and the target cellular network standard can be indicated in the Cellular Data Preference Field in the Cellular Data Connection Preference Attribute signaling.

In an embodiment, the handover signaling may further carry base station identification information of a base station for providing a data connection for the multimode station. The access point device may acquire load information of each base station, and determine the base station with the least load as a base station for providing a data connection for the multimode station.

In step 302, information of the target cellular network standard is parsed from the handover signaling.

In an embodiment, the target cellular network standard can be determined by parsing the handover signaling to acquire the value of Cellular Data Preference Field. For example, if the value is 2, the target cellular network standard can be determined as TD-LTE, and if the value is 3, the target cellular network standard can be determined as GSM.

In an embodiment, the cellular network standard corresponding to the value of Cellular Data Field can be predetermined by the system.

In step 303, the service data is transmitted over the target cellular network in the target cellular network standard.

In an embodiment, the multimode station may establish a data connection with the base station covering the current range and using the target cellular network standard on the basis of the target cellular network standard, and then transmit service data.

In an exemplary scene, as shown in FIG. 1B, after receiving the handover signaling sent by the access point device 30, the station 20 may parse the signaling to acquire information of the target cellular network standard for bearing service data, thereby establishing a data connection with the base stations 10 supporting the target cellular network standard. By methods of indicating accurately the target cellular network by the access point device 30, the efficiency of offloading the service data of the station 20 is improved.

In this embodiment, by the foregoing steps 301-303, a user equipment can quickly transmit the service data over the target cellular network on the basis of the indication of the access point device in the handover signaling. And it can be ensured that the problem of low data offloading efficiency due to the station device itself attempting to access cellular networks of different standards, and better services will be provided for the station because the load of the target cellular network proposed by the access network device is relatively small.

In an embodiment, the data offloading method may further include:

reporting the supported cellular network standard to the access network device.

In an embodiment, the handover signaling may further carry base station identification information of a base station for providing a data connection for the multimode station.

In an embodiment, the step of transmitting service data over the target cellular network in the target cellular network standard may include:

establishing a data connection with the base station identified by the base station identification information; and transmitting the service data over the data connection.

For the specific manner of data transmission, please refer to the subsequent embodiments.

The technical solution provided by the present disclosure embodiments will be described by specific embodiments as follows.

Figure 4:
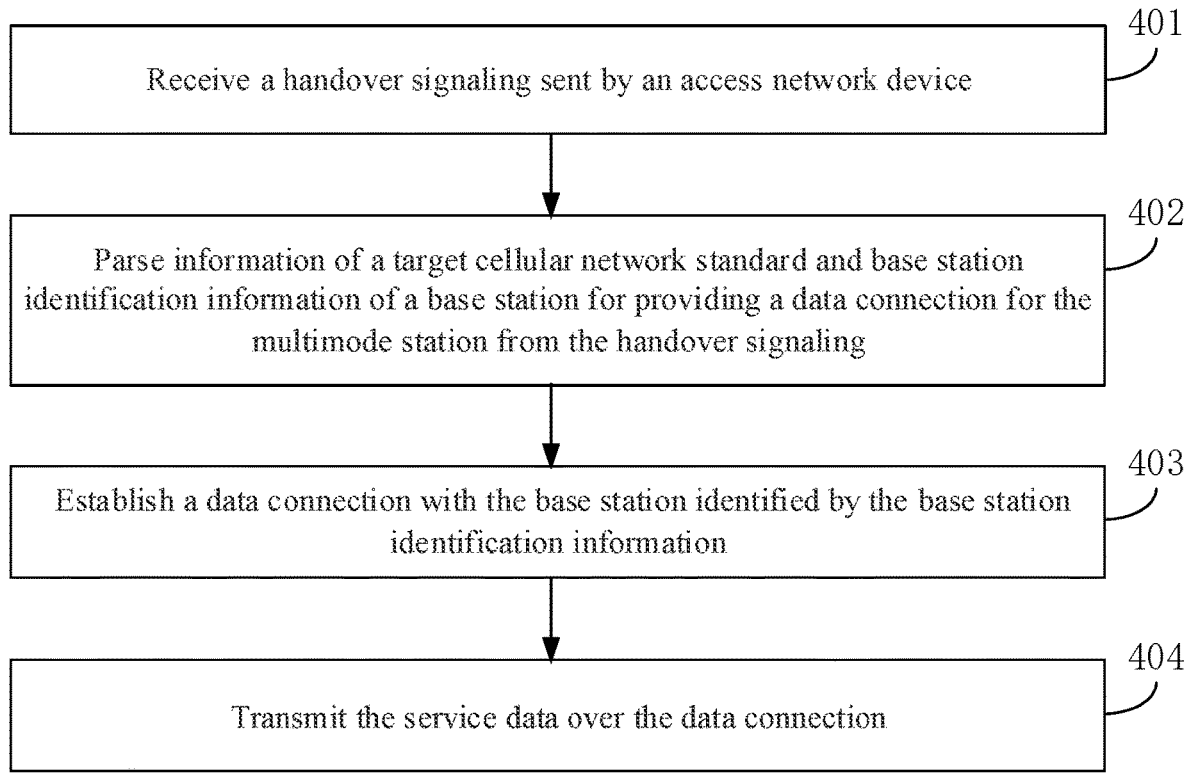
FIG. 4 is a flowchart of still another data offloading method illustrated according to an exemplary embodiment.

FIG. 4 is a flowchart of still another data offloading method illustrated according to an exemplary embodiment. In the present embodiment, by using the above method provided by the present disclosure embodiment, exemplary descriptions are given by providing an example of how the station directedly access a specified base station, as shown in FIG. 4, the following steps are included:

In step 401, the handover signaling sent by the access network device is received.

In step 402, information of the target cellular network standard and the base station identification information of the base station for providing a data connection for the multimode station are parsed from the handover signaling.

In an embodiment, the access point device may acquire the load information of each base station, and may determine the base station with the least load as a base station for providing a data connection for the multimode station, then send the information of the base station to the multimode station over the handover signaling.

In step 403, a data connection is established with the base station identified by the base station identification information.

In an embodiment, the multimode station may directly establish the data connection with the base stations after parsing the base station identification information from the handover signaling.

In step 404, the service data is transmitted over the data connection.

In this embodiment, a user equipment can quickly establish a data connection with the specified base station on the basis of the indication of the access point device in the handover signaling, and the efficiency of the station to access a cellular network can be ensured. Meanwhile, better services will be provided for the station, because the load of the specified base station is relatively small and the wireless link resources allocated by the base station for the multi mode station will be relatively good.

Figure 5:
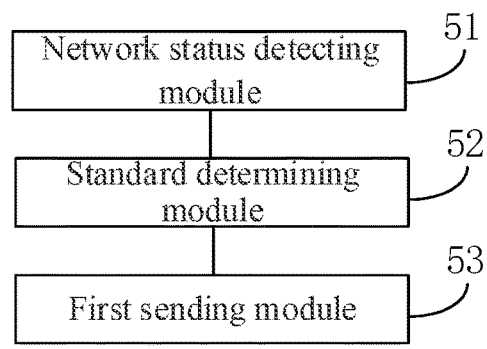
FIG. 5 is a block diagram of a data offloading device illustrated according to an exemplary embodiment.

FIG. 5 is a block diagram of a data offloading device illustrated according to an exemplary embodiment. As shown in FIG. 5, the data offloading device includes:

a network status detecting module 51 configured to detect the network status of the access point device;

a standard determining module 52 configured to determine a target cellular network standard for bearing service data of a multimode station when the network status meets a preset condition; and a first sending module 53 configured to send a handover signaling to the multimode station, the handover signaling carrying information of the target cellular network standard.

Figure 6:
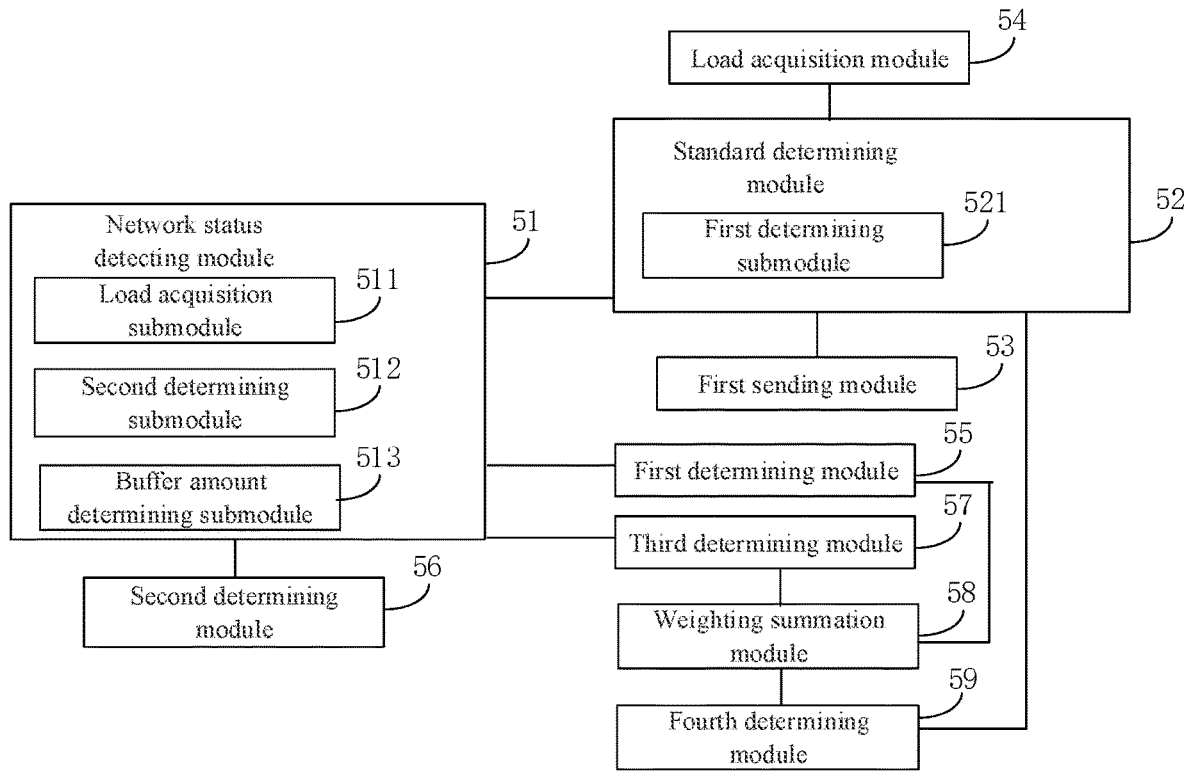
FIG. 6 is a block diagram of another data offloading device illustrated according to an exemplary embodiment.

FIG. 6 is a block diagram of another data offloading device illustrated according to an exemplary embodiment. As shown in FIG. 6, in an embodiment, on the basis of the above-described embodiment shown in FIG. 5, the handover signaling further carries base station identification information of a base station for providing a data connection for the multimode station.

In an embodiment, the standard determining module 52 includes:

a first determining submodule 521 configured to determine the target cellular network standard for bearing the service data of the multimode station on the basis of the cellular network standard supported by the multimode station, the cellular network covering the current location, and the corresponding data load.

In an embodiment, the device further includes:

a load acquisition module 54 configured to acquire information of the cellular network covering the current location and the corresponding data load through a preset interface.

In an embodiment, the network status detecting module 51 includes:

a load acquisition submodule 511 configured to acquire load information of the access point device;

a second determining submodule 512 configured to detect the quality of the link between the access point device and the multimode station; and a buffer amount determining submodule 513 configured to acquire a buffer amount of the service data of the multimode station.

In an embodiment, the device further includes:

a first determining module 55 configured to determine, according to load information of the access point device, a load score of a local area network where the access point device is located;

a second determining module 56 configured to determine a link quality score on the basis of the quality of the link between the access point device and the multimode station;

a third determining module 57 configured to determine a station buffer score on the basis of the buffer amount of the service data of the multimode station;

a weighting summation module 58 configured to perform a weighting summation on the load score, the link quality score, and the station buffer score to obtain a network status score; and a fourth determining module 59 configured to determine that the network status meets the preset condition when the network status score is greater than a preset score.

Figure 7:
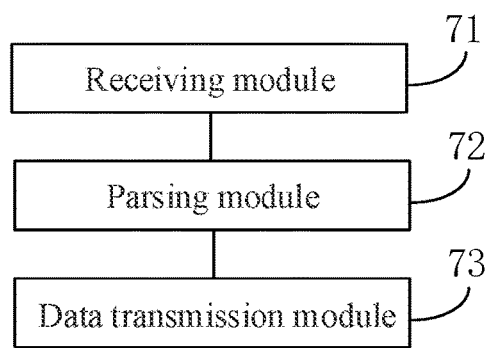
FIG. 7 is a block diagram of yet another data offloading device illustrated according to an exemplary embodiment.

FIG. 7 is a block diagram of yet another data offloading device illustrated according to an exemplary embodiment. As shown in FIG. 7, the data offloading device includes:

a receiving module 71 configured to receive a handover signaling sent by an access network device;

a parsing module 72 configured to parse information of a target cellular network standard from the handover signaling; and a data transmission module 73 configured to transmit service data over the target cellular network in the target cellular network standard.

Figure 8:
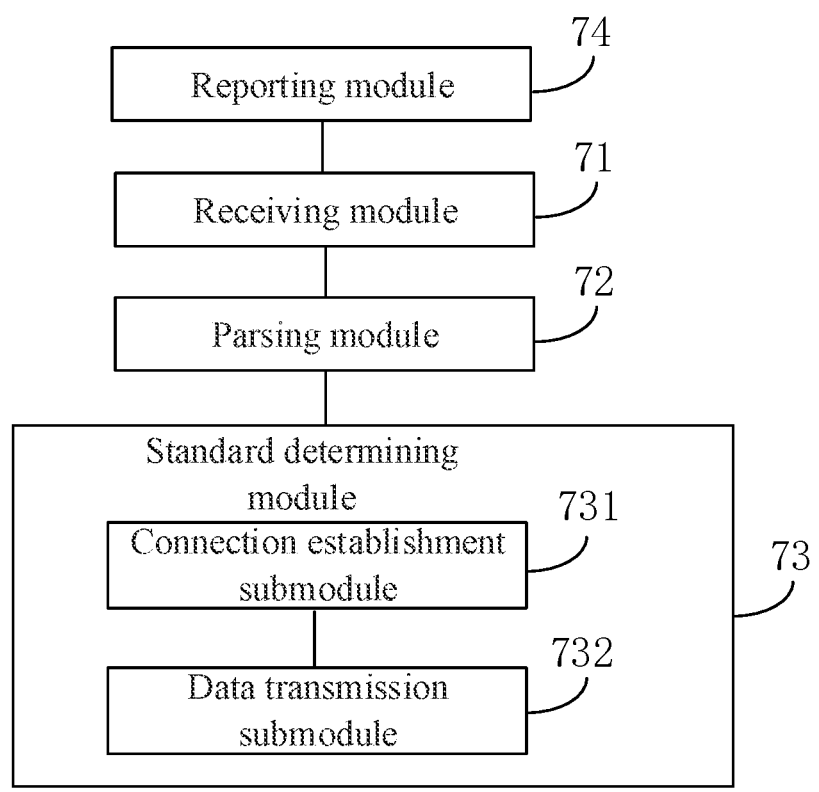
FIG. 8 is a block diagram of still another data offloading device illustrated according to an exemplary embodiment.

FIG. 8 is a block diagram of still another data offloading device illustrated according to an exemplary embodiment. As shown in FIG. 8, in an embodiment, on the basis of the above-described embodiment shown in FIG. 7, the device further includes:

a reporting module 74 configured to report the supported cellular network standard to the access network device.

In an embodiment, the handover signaling further carries base station identification information of a base station for providing a data connection for the multimode station.

In an embodiment, the data transmission module 73 includes:

a connection establishment submodule 731 configured to establish a data connection with the base station identified by the base station identification information; and a data transmission submodule 732 configured to transmit the service data over the data connection.

For the data offloading device in the above embodiments, the specific manner of performing operation of each module has been described in detail in embodiments of the data offloading method, and will not be described in detail here.

Figure 9:
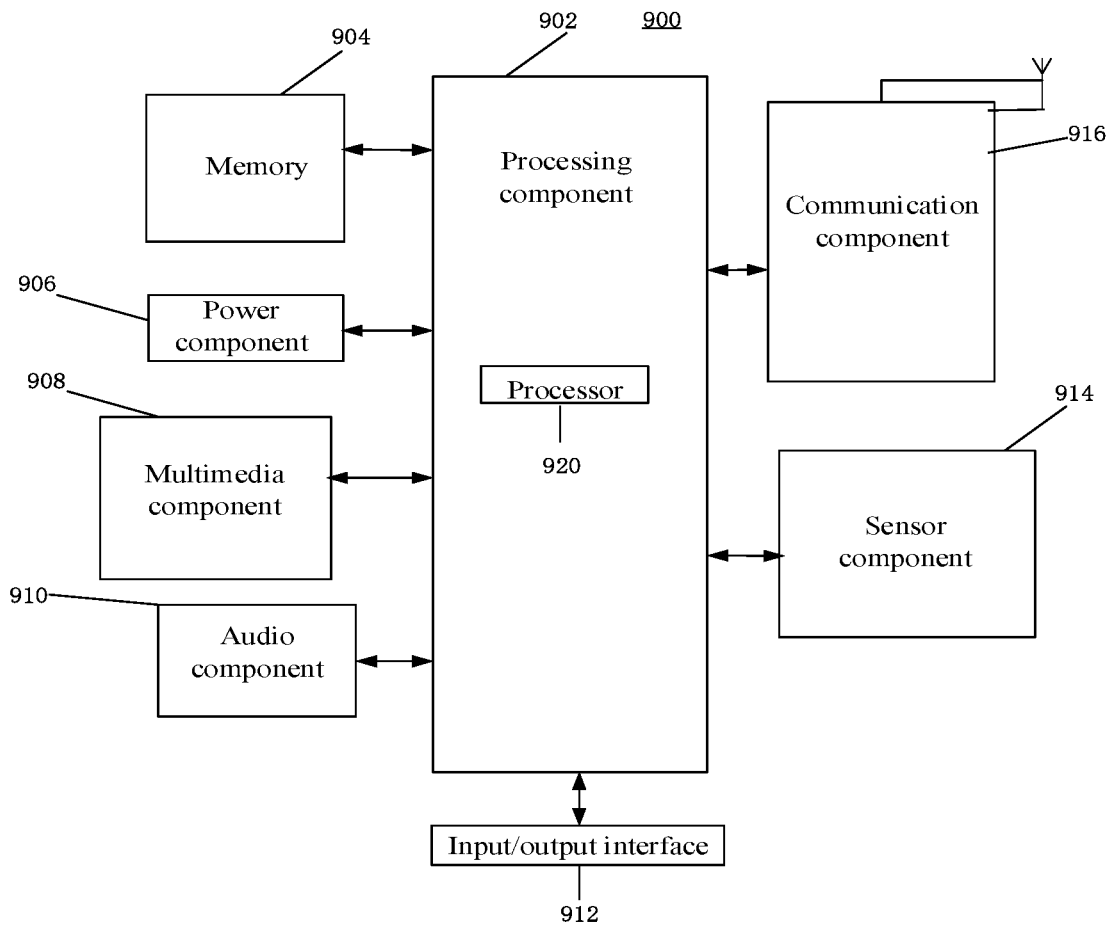
FIG. 9 is a block diagram applicable to a data offloading device illustrated according to an exemplary embodiment.

FIG. 9 is a block diagram applicable to a data offloading device illustrated according to an exemplary embodiment. For example, the device 900 may be a mobile phone, a computer, a digital broadcast station, a messaging device, a gaming console, a tablet device, a medical device, a fitness equipment, a personal digital assistant, and other multimode station.

Referring to FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls the overall operations of the device 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, videos, etc. The memory 904 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power for the device 900.

The multimedia component 908 includes a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 908 includes a front camera and/or a rear camera. The front camera and/or the rear camera may receive external multimedia data while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive external audio signals when the device 900 is in an operation mode, such as a call mode, a recording mode, and a voice recognition mode. The received audio signal may be further stored in the memory 904 or transmitted via the communication component 916. In some embodiments, the audio component 910 further includes a speaker for outputting audio signals.

The I/O interface 912 provides an interface between the processing component 902 and peripheral interface modules, such as a keyboard, a click wheel, buttons, and the like. The buttons may include, but are not limited to, a home button, a volume button, a start button, and a lock button.

The sensor component 914 includes one or more sensors to provide status assessments of various aspects of the device 900. For instance, the sensor component 914 may detect an on/off status of the device 900, relative positioning of components, e.g., the display device and the mini keyboard of the device 900, and the sensor component 914 may also detect a position change of the device 900 or a component of the device 900, presence or absence of user contact with the device 900, orientation or acceleration/deceleration of the device 900, and temperature change of the device 900. The sensor component 914 may include a proximity sensor configured to detect the presence of nearby objects without any physical contact. The sensor component 914 may also include a light sensor, such as a CMOS or CCD image sensor, used for imaging applications. In some embodiments, the sensor component 914 may also include an accelerometer sensor, a gyroscope sensor, a magnetic sensor, a pressure sensor, or a temperature sensor.

The communication component 916 is configured to facilitate wired or wireless communication between the device 900 and other devices. The device 900 can access a wireless network based on a communication standard, such as WiFi, 2G, or 3G, or a combination thereof. In an exemplary embodiment, the communication component 916 receives broadcast signals or broadcast associated information from an external broadcast management system via a broadcast channel. In an exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 904 including instructions, executable by the processor 920 in the device 900, for performing the above-described methods. For example, the non-transitory computer-readable storage medium may be a ROM, a RAM, a CD-ROM, a magnetic tape, a floppy disc, an optical data storage device, and the like.

Wherein the processor 920 is configured to:
detect a network status of an access point device;
determine a target cellular network standard for bearing service data of a multimode station when the network status meets a preset condition; and
send a handover signaling to the multimode station, the handover signaling carrying information of the target cellular network standard.

Figure 10:
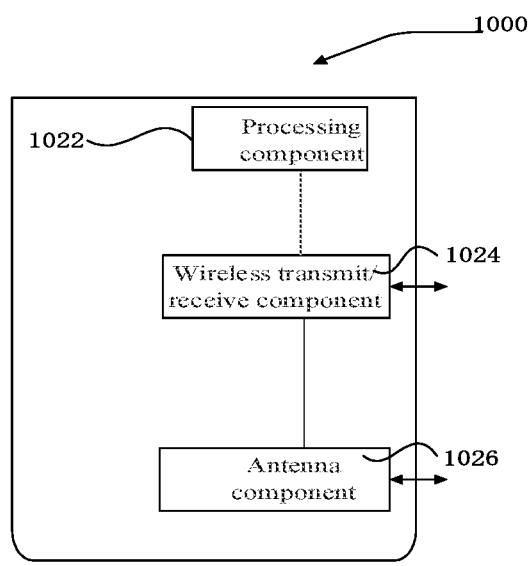
FIG. 10 is another block diagram applicable to a data offloading device illustrated according to an exemplary embodiment.

FIG. 10 is another block diagram applicable to a data offloading device illustrated according to an exemplary embodiment. Device 1000 can be provided as a base station. Referring to FIG. 10, device 1000 includes a processing component 1022, a wireless transmit/receive component 1024, an antenna component 1026, and a signal processing portion specific to the wireless interface, and the processing component 1022 can further include one or more processors.

One of the processing components 1022 can be configured to:
receive a handover signaling sent by an access network device;
parse information of a target cellular network standard from the handover signaling; and
transmit service data over the target cellular network in the target cellular network standard.

The technical solutions provided by the embodiments of the present disclosure may achieve the following beneficial effects:

Because the cellular network and the WLAN network are two independent communication networks, when the network status of the WLAN network arrive at a preset condition, such as a heavy network load and a poor link quality of the link with a multimode station, by implementing the foregoing technical solutions, the present embodiments can determine that the service data of the multimode station can be transmitted through the target cellular network in the target cellular network standard, so that it can accurately indicate that the service data of the multimode station are offloaded to the specific target cellular network. Therefore, it solves the problem in the related art that, the efficiency of implementing data offloading is reduced, because of a fact that the multimode station needs trying to access cellular networks in different standards because it cannot indicate to which cellular network data are offloaded.

Other embodiments of the present disclosure will be apparent to those skilled in the art from consideration of the specification and practice of the present disclosure. This disclosure is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A data offloading method, comprising:
   detecting, by an access point device, a network status of the access point device;
   determining, by the access point device, a target cellular network standard for beating service data of a multimode station when the network status meets a preset condition; and
   sending, by the access point device, a handover signaling to the multimode station, the handover signaling carrying information of the target cellular network standard,
   wherein detecting the network status of the access point device comprises:
   acquiring load information of the access point device;
   detecting a link quality of a link between the access point device and the multimode station; and
   acquiring a buffer amount of the service data of the multimode station.

2. The method according to claim 1, wherein the handover signaling further carries base station identification information of a base station for providing a data connection for the multimode station.

3. The method according to claim 1, wherein determining the target cellular network standard for bearing service data of the multimode station comprises:
   determining the target cellular network standard for bearing the service data of the multimode station on the basis of the cellular network standard supported by the multimode station, the cellular network covering a current location, and a corresponding data load.

4. The method of claim 3, wherein the method further comprises:
   acquiring information of the cellular network covering the current location and the corresponding data load through a preset interface.

5. The method of claim 1, wherein the method further comprises:
   determining, according to load information of the access point device, a load score of a local area network where the access point device is located;
   determining a link quality score on the basis of the link quality of the link between the access point device and the multimode station;
   determining a station buffer score on the basis of the buffer amount of the service data of the multimode station;
   performing a weighting summation on the load score, the link quality score, and the station buffer score to obtain a network status score; and
   determining that the network status meets the preset condition when the network status score is greater than a preset score.

6. A user equipment, comprising:
   a processor;
   a memory for storing processor executable instructions;
   wherein the processor is configured to:
   detect a network status of an access point device by:
      acquiring load information of the access point device;
      detecting a links quality of a link between the access point device and the multimode station; and
      acquiring a buffer amount of the service data of the multimode station;
   determine a target cellular network standard for bearing service data of a multimode station when the network status meets a preset condition; and
   send a handover signaling to the multimode station, the handover signaling carrying information of the target cellular network standard.

7. The user equipment according to claim 6, wherein the handover signaling further carries base station identification information of a base station for providing a data connection for the multimode station.

8. The user equipment according to claim 6, wherein the processor is further configured to:
   determine, the target cellular network standard for bearing the service data of the multimode station on the basis of the cellular network standard supported by the multimode station, the cellular network covering a current location, and a corresponding data load.

9. The user equipment according to claim 8, wherein the processor is further configured to:
   acquire information of the cellular network covering the current location and the corresponding data load through a preset interface.

10. The user equipment according to claim 6, wherein the processor is further configured to:
    determine, according to load information of the access point device, a load score of a local area network where the access point device is located;
    determine a link quality score on the basis of the link quality of the link between the access point device and the multimode station;
    determine a station buffer score on the basis of the buffer amount of the service data of the multimode station;
    perform a weighting summation on the load score, the link quality score, and the station buffer score to obtain a network status score; and
    determine that the network status meets the preset condition when the network status score is greater than a preset score.

* * * * *